United States Patent Office 2,722,556
Patented Nov. 1, 1955

2,722,556

PREPARATION OF TERTIARY BUTYL HYDROQUINONE

De Walt S. Young and George F. Rodgers, Kingsport, Tenn., assignors to Eastman Kodak Company, Rochester, N. Y., a corporation of New Jersey No Drawing. Application March 19, 1952,
Serial No. 277,548

14 Claims. (Cl. 260—625)

This invention relates to a process for preparing a mixture of a major proportion of 2-tertiary butyl-4-methoxyphenol and a minor proportion of 3-tertiary butyl-4-methoxy phenol which comprises reacting mono-tertiary butyl hydroquinone with dimethyl sulfate or methyl acid sulfate in an alkaline aqueous solution containing zinc dust at an elevated temperature. This invention also relates to the preparation of the mono-tertiary butyl hydroquinone required above which comprises reacting hydroquinone with tertiary butyl alcohol or isobutylene admixed with an aromatic hydrocarbon such as toluene in the presence of phosphoric acid at an elevated temperature with agitation.

One procedure now being used for the preparation of the two isomers of tertiary butyl-4-methoxyphenol involves the reaction of hydroquinone with a methylating agent to obtain 4-methoxy-phenol, followed by alkylation of the latter with a source of the tertiary butyl radical, such as isobutylene or tertiary butyl alcohol.

Except for minor modifications of technique, a process such as that has been known for a long time and is well described in the prior art. However, the preparation of the two isomers of tertiary butyl-4-methoxyphenol as in such a process is subject to certain inherent disadvantages which may be avoided through operation according to this invention. For instance, it is not possible to completely convert hydroquinone to the corresponding 4-methoxyphenol by means of any known practical process. Part of the starting hydroquinone is unavoidably converted into 1,4-dimethoxybenzene, which cannot be advantageously employed in the preparation of isomers of tertiary butyl-4-methoxyphenol and thus represents a loss. In addition, the butylation of 4-methoxyphenol presents further difficulties in that the product is contaminated with dibutylated derivatives of 4-methoxyphenol as well as unreacted starting materials; hence, the isolation of the desired product requires a careful separation from these impurities. Although any unreacted 4-methoxyphenol may be recovered and recycled, the dialkylated derivative is of little value and has to be subjected to an entirely different and additional reaction if any useful product of the food antioxidant category is to be obtained.

A further disadvantage which results through the use of this prior art type of procedure is to be found in the unfavorable ratio of the two possible isomers of the mono-butylated-4-methoxy phenol, viz. 2-tertiary butyl-4-methoxyphenol and 3-tertiary butyl-4-methoxyphenol. A study of the relative potency of these two isomers as antioxidants in fats, vegetable oils, etc. has shown that 2-tertiary butyl-4-methoxyphenol is of considerably more value than the other isomer. In the preparation of isomers of butylated-4-methoxyphenol according to the methods of the type disclosed by the prior art as discussed above, the less potent isomer, viz. 3-tertiary butyl-4-methoxyphenol, predominates in the final product.

We have now found that the desired preparation of a product which contains an unusually high proportion of the desired 2-tertiary butyl-4-methoxyphenol can be achieved with greater economy and over-all efficiency by a process involving an inverted method to that of the type referred to above as disclosed by the prior art. According to our discovery, hydroquinone is first treated with a butylating agent in accordance with an especially effective process to form the mono-tertiary butyl derivative which is then converted according to another aspect of our invention to a product comprising an unusually high percentage of the desired 2-tertiary butyl-4-methoxyphenol.

It is an object of our invention to provide an especially effective process for preparing a mixture of the two isomers of tertiary butyl-4-methoxyphenol whereby the isomer having the greatest potency as a food antioxidant is prepared in larger proportions than could be done by the prior art processes such as discussed hereinabove. A further object of our invention is to provide an advantageous process for preparing mono-tertiary butylhydroquinone whereby a large proportion of mono-butylated hydroquinone is obtained and the quantity of dibutylated hydroquinone is maintained at a minimum. Other objects will become apparent hereinafter.

MONO-TERTIARY BUTYL HYDROQUINONE

The first aspect of our invention to be discussed in detail relates to a process for preparing mono-tertiary butyl-hydroquinone which comprises reacting hydroquinone with a branched-chain compound selected from those of the group consisting of isobutylene and tertiary butyl alcohol admixed with an aromatic hydrocarbon containing from 6 to 8 carbon atoms in the presence of phosphoric acid at an elevated temperature with agitation. It is a newly discovered and surprising fact that the mono-alkylated derivative first formed is immediately and to a surprisingly high degree removed from the hydroquinone-catalyst phase into solution in the aromatic hydrocarbon and is thereby substantially protected from further alkylation. After the reaction is complete, the desired mono-alkylated product can be recovered from the aromatic liquid hydrocarbon by any procedure obvious to those skilled in the art such as by crystallization and filtration. Alternatively, the aromatic liquid can be employed to continuously extract the mono-alkylated product from the reaction mixture as the reaction is in progress.

One of the most important phases of this aspect of the invention resides in the employment of the aromatic nonmiscible liquid hydrocarbon. The use of such a solvent as toluene or xylene is superior to any other solvent suggested by the prior art for use in such a process. The following experiments will serve to illustrate the disadvantages of employing solvents other than aromatic hydrocarbons.

Experiment A.—Heptane solvent 110 grams of hydroquinone, 400 cc. of 85% phosphoric acid, and 300 ml. of heptane were mixed, heated to reflux at 88° C., and the 74 grams of tertiary butyl alcohol was added over a 30-minute period. When the addition was complete, the hot mixture consisted of a muddy acid layer and a white tarry solvent layer which could not be separated by decantation or filtration. The mixture was therefore diluted with three volumes of water and cooled to 25° C., causing the slushy heptane layer to further harden enough to be filtered from the aqueous solution. The heptane mixture was then suspended in hot water and the solvent removed by steam distillation. The hot aqueous suspension was filtered to remove 60.4 grams of di-tertiary butylhydroquinone and the filtrate was cooled to bring about crystallization of the mono-tertiary butyl hydroquinone. The weight of mono-tertiary butyl hydroquinone isolated was 20.5 grams which had a melting point of 125–28° C. The percent conversion based on the hydroquinone was 12.2 percent.

Experiment B.—Hexane solvent 55 grams of hydroquinone, 15 grams of phosphoric acid, and 300 ml. of hexane were mixed in a 500 cc. capacity autoclave which was provided with stirring means. The autoclave was closed and 45 grams of isobutylene was run in with stirring. The mixture was heated slowly to 75° C. and then cooled, the total reaction time above 50° C. being 1¼ hours. The slurry was then poured into hot water and the hexane removed with steam. The hot mixture was filtered to remove 58 grams of di-tertiary butyl hydroquinone. The filtrate was cooled to bring about crystallization of the mono-tertiary butyl hydroquinone which amounted to less than one gram.

It is evident that this process as exemplified by Experiment B is even less satisfactory than that set forth in Experiment A.

Experiment C.—Alkylation in absence of a solvent 110 grams of hydroquinone and 400 cc. of 85% phosphoric acid were mixed, heated to 95° C., and 74 grams of tertiary butyl alcohol was added over a period of 30 minutes. The reaction mixture, which contained a finely divided white solid, was diluted to 3000 ml. with water, cooled to 25° C., and filtered. The white product was treated with boiling water, and the mixture filtered hot to remove the di-tertiary butyl hydroquinone. The di-tertiary butyl hydroquinone obtained weighed 91 grams. It had a melting point of 210–12° C. The filtrate did not deposit any mono-tertiary butyl hydroquinone upon cooling.

It is quite evident that the entire absence of a solvent in the process results in the complete failure to produce any substantial quantity of mono-tertiary butyl hydroquinone.

The following example serves to illustrate the process of our invention in a manner as nearly identical as possible to the process of Experiment A. In each of Example 1 and Experiment A, the mono-tertiary butyl hydroquinone was filtered from two liters of water. It is evident that the process employing toluene is far superior:

Example 1.—Toluene solvent 300 cc. of toluene, 110 grams of hydroquinone, and 400 cc. of 85% phosphoric acid were mixed, heated to 92° C. and 74 grams of tertiary butyl alcohol was introduced over a 30-minute period. When the addition was complete, the hot reaction mixture was a two-phase system consisting of a toluene solution and an aqueous phosphoric acid solution. No solid material was present. The hot toluene layer was separated and subjected to steam distillation to remove the aromatic hydrocarbon solvent, leaving behind an aqueous suspension which was filtered hot so as to isolate 37.8 grams of ditertiary butyl hydroquinone. The filtrate was cooled to bring about crystallization of mono-tertiary butyl hydroquinone which was isolated by filtration. The weight of mono-tertiary butyl hydroquinone isolated was 49.5 grams which had a melting point of 127–29° C. The percent conversion based on the hydroquinone employed was 29.8 percent.

The following example serves to illustrate the employment of xylene as the solvent and isobutylene as the alkylating agent in a process otherwise similar to Example 1 given above:

Example 2.—Xylene solvent 147 grams of hydroquinone, 250 grams of 85% phosphoric acid and 500 cc. of xylene were mixed in a three neck flask provided with thermometer, agitator and reflux condenser. The temperature was increased to 105° with good agitation and 55 grams of isobutylene was introduced over a one-hour period. Next, the supernatant xylene layer was drawn off, and the lower phosphoric acid layer was preserved for use in the following run.

The xylene layer on cooling deposited a white crystalline solid which weighed 154 gms. This material consisted of mono-tertiary butyl hydroquinone mixed with small amounts of hydroquinone and 2,5-ditertiary butyl hydroquinone. The crude product was easily purified by recrystallization from hot water to yield pure mono-tertiary butyl hydroquinone M. P.=127–128° C.

The process of our invention as exemplified by Examples 1 and 2 involves the reaction of approximately equimolecular proportions of hydroquinone and tertiary butyl alcohol in order to accomplish the most advantageous results. However, higher and lower proportions within the vicinity of a ratio of 1:1 can be employed.

The solvent which is employed in accordance with our invention is most advantageously toluene or xylene although other aromatic hydrocarbons of the benzene series containing from six to eight or nine carbon atoms can be employed.

The catalyst employed in accordance with our invention is most advantageously phosphoric acid; however, other acid catalysts can be employed. The use of 85% phosphoric acid is advantageously employed in the various examples given; however, equivalent quantities of other strengths or concentrations of phosphoric acid can also be employed.

The elevated temperature employed in accordance with our process is most advantageously that at which reflux conditions exist. With proper stirring, temperatures which are higher or lower than that provided by reflux can also be employed. Temperatures of from about 65° to about 110° C. can be advantageously employed.

The following examples will serve to further illustrate this aspect of our invention:

Example 3.—Xylene solvent 110 grams of hydroquinone, 400 cc. of 85% phosphoric acid and 400 cc. of xylene were mixed in a three neck flask provided with a thermomenter, agitator and reflux condenser. The temperature was raised to 105° C. with good agitation and 73 grams of tertiary butyl alcohol was introduced with good agitation over a 1-hour period. Next, the supernatant xylene layer was drawn off, and the lower phosphoric acid layer was preserved for use in a subsequent run. The xylene layer on cooling deposited a white crystalline solid which weighed 133 grams. This crude material was substantially mono-tertiary butyl hydroquinone and was purified by recrystallization from hot water so as to yield pure mono-tertiary butyl hydroquinone having a melting point of 127–128° C.

The water which is formed by the employment of tertiary butyl alcohol in the course of the reaction as in Example 2 dilutes the reaction mixture but can be readily removed by azeotropic distillation of the reaction mixture.

In addition to the procedure illustrated by Examples 1, 2 and 3, a successive batch process can be advantageously employed for preparing mono-tertiary butylhydroquinone which comprises (1) admixing under reflux conditions about one mole proportion of hydroquinone, from about 1 to about 5 times the same weight of phosphoric acid and from about 1 to about 2 times the same weight of an aromatic hydrocarbon containing from 6 to 8 carbon atoms, (2) maintaining this admixture at its boiling point under good agitation and gradually introducing into this admixture about one mole proportion of tertiary butyl alcohol while substantially concurrently removing water by azeotropic distillation, (3) thereafter separating while hot the layer containing the principal part of the aromatic hydrocarbon from the layer containing the phosphoric acid and (4) then cooling this layer whereby a product consisting primarily of mono-tertiary butylhydroquinone separates as crystals.

Example 4.—Successive batch process

In this example a series of seven batches was run using the same phosphoric acid and the same toluene throughout. The procedure for the first batch of the series was as follows:

BATCH NO. 1

242 grams of hydroquinone, 1200 grams of 85% phosphoric acid and 8000 ml. of toluene were mixed in a round-bottomed flask and heated to reflux with stirring. 444 grams of tertiary butyl alcohol was added at the rate of 148 grams every 45 minutes; during each such 45-minute period, 36 ml. of water was removed azeotropically. Additional quantities of 242 grams of hydroquinone were added at the end of 45 and of 90 minutes, making a total quantity of 726 grams of hydroquinone employed. The addition of the tertiary butyl alcohol was complete in 135 minutes, after which the hot toluene layer was immediately withdrawn and cooled to 15° C. The solid product which formed was removed by filtration and the toluene filtrate returned to the reaction flask for the next run. The solid product was then treated with boiling water and filtered hot to remove the di-tertiary butyl hydroquinone. The filtrate was cooled to 25° C. to cause the crystallization of the mono-tertiary butyl hydroquinone. The product was filtered off and the mother liquor was saved for the purification of the next batch.

BATCHES 2 THROUGH 7

The second through the seventh batch were run using the same phosphoric acid and the same toluene as in the first batch. The procedure for each of these batches was the same as for the first batch except that only 660 grams of hydroquinone was employed in each by initially admixing 220 grams of hydroquinone and adding the remainder thereof in two equal portions of 220 grams at the end of 45 minutes and 90 minutes. Otherwise the procedure of the first batch was repeated identically.

OVERALL RESULTS OBTAINED

Materials charged:

| | |
|---|---|
| Hydroquinone | 4,686 grams (42.6 mols). |
| Tertiary butyl alcohol | 3,108 grams (42.0 mols). |
| Toluene | 10,300 ml. |
| 85% phosphoric acid | 1,200 grams. |

Products recovered:

| | |
|---|---|
| Mono-tertiary butyl hydroquinone | 4,171 grams (59.0%). |
| Di-tertiary butyl hydroquinone | 1,222 grams (12.9%). |

The percent conversions given above are based on the quantity of hydroquinone employed in the reaction and demonstrate the high conversion of mono-tertiary butyl hydroquinone which can be obtained. In the seven batches which were run in the above example, the original 1200 grams of phosphoric acid was employed throughout and the original 8000 ml. of toluene was supplemented by the addition of only 2300 ml. during the course of the following batches.

In addition to the successive batch procedure of Example 4, a continuous process can be advantageously employed for preparing mono-tertiary butylhydroquinone which comprises (1) admixing approximately equal volumes of phosphoric acid (calculated as 85% phosphoric acid) and an aromatic hydrocarbon containing from 6 to 8 carbon atoms, (2) maintaining this admixture at its boiling point and maintaining the lower portion of this admixture under good agitation while continuously introducing into this admixture approximately equimolecular proportions of hydroquinone and teriary butyl alcohol together wtih sufficient additional aromatic hydrocarbon to replace that removed as indicated in (3) and (4) hereinbelow, (3) continuously removing water substantially concurrently as it is formed by means of distilling off an azeotrope of water and aromatic hydrocarbon, (4) continuously removing from the upper part of the liquid reaction mixture a minor portion thereof which comprises a solution of mono-tertiary butylhydroquinone dissolved in the aromatic hydrocarbon, and (5) separating the mono-tertiary butylhydroquinone from this solution.

*Example 5.—Continuous process*

Hydroquinone was alkylated with tertiary butyl alcohol in a continuous process, the alkylated products being subsequently separated and purified batch-wise. The alkylation was carried out by feeding hydroquinone, tertiary butyl alcohol, and toluene into the bottom of a cylindrical reactor containing about half its volume of 85% phosphoric acid as the lower layer and the other half filled with toluene as an upper layer. The mixture was well stirred at the bottom but kept relatively quiet at the top to allow good separation of the layers and permit continuous removal of the toluene solution of the product through a side tube at the top of the reactor. The water formed during the reaction was removed continuously by azeotropic distillation. The toluene solution of the product was taken off from the top of the reaction mixture and led into a steam still where the toluene solvent was distilled and returned to a toluene feed tank from which the toluene being withdrawn from the reaction mixture was replaced. When sufficient product had accumulated in the steam still to form a batch, the toluene product being withdrawn was switched to another receiver, and the purification of the product continued batch-wise. The di-tertiary butyl hydroquinone was filtered from the hot toluene-free aqueous slurry and the filtrate cooled to 50° C. The mono-tertiary butyl hydroquinone which crystallized was filtered off, and the mother liquor returned to the steam still for reuse. The results obtained in a 72-hour run with this process are summarized as follows:

Materials charged:

| | |
|---|---|
| Hydroquinone | 9,845 grams. |
| Tertiary butyl alcohol | 6,882 grams. |
| Toluene | 13,010 grams. |
| 85% phosphoric acid | 745 grams. |

Products recovered:

| | |
|---|---|
| Hydroquinone | 1,578. |
| Mono-tertiary butyl hydroquinone. | 9,245 (62.2% conversion). |
| Di-tertiary butyl hydroquinone. | 2,321 (11.7% conversion). |
| Toluene | 9,275. |

In the above example, the percent yield of mono-tertiary butyl hydroquinone based on the amount of hydroquinone consumed was 74 percent. About 4½% of 85% phosphoric acid was employed based on the total weight of hydroquinone and tertiary butyl alcohol employed as starting materials in the above example.

As indicated by the above examples, it is advantageous to operate at reaction temperatures of about 65° to about 110° C. The xylene employed has a boiling point of about 142° C.; the boiling point of toluene is about 110° C. In regard to the temperature employed, a limiting factor is the tendency for isobutylene to escape from the reaction mixture at temperatures substantially higher than 100° C., although a pressure vessel can be employed to avoid this effect. The period required for the reaction can be varied within wide limits; however, there seems to be no reason to prolong the reaction duration beyond several hours. The quantities of the various materials employed can be varied within wide limits. It is advantageous to maintain the molar ratio of hydroquinone to tertiary butyl alcohol at a value greater than unity; however, ratios of from about .962 to about 1.015 are illustrated by the above examples and a wider variation than this can also be employed.

Mono-tertiary butyl hydroquinone is an effective agent for the stabilization of various animal and vegetable oils and fats against deterioration. Its potency in this regard is much greater than that of 2,5-di-tertiary butyl hydroquinone which is produced in substantial quantities according to the prior art method of alkylating hydroquinone with isobutylene or tertiary butyl alcohol as described above.

The availability of mono-tertiary butyl hydroquinone in accordance with the process of this invention as just described makes possible the hereinafter described especially effective method of synthesizing tertiary butyl hydroxy anisole, commonly known as BHA in the food antioxidant industry. BHA is a mixture of 2-tertiary butyl-4-methoxyphenol and 3-tertiary butyl-4-methoxyphenol. Inasmuch as the 2-tertiary butyl-4-methoxyphenol isomer is the most potent food antioxidant of the two isomers present in BHA; it is therefore quite desirable to provide a process for preparing BHA wherein the proportion of the more effective isomer is substantially larger than that which could be heretofore provided by the prior art.

In addition to employing mono-tertiary butyl hydroquinone in the prepartion of BHA isomers, it is also useful as an intermediate in the preparation of other compounds such as its dialkyl ethers which are valuable as ingredients in perfumes and have other uses as odorants such as are described hereinbelow.

MONO-TERTIARY BUTYL-4-METHOXYPHENOL

The second aspect of our invention provides a process for preparing a mixture of a major proportion of 2-tertiary butyl-4-methoxyphenol and a minor proportion of 3-tertiary butyl-4-methoxyphenol which comprises reacting at an elevated temperature mono-tertiary butylhydroquinone with a compound selected from the group consisting of methyl chloride, dimethyl sulfate and methyl acid sulfate in an aqueous alkaline solution containing at least about 0.1% of comminuted zinc under an atmosphere containing insufficient oxygen to substantially oxidize the phenolic hydroxyl radicals under these conditions. Dimethyl sulfate is most advantageously employed.

According to the prior art procedure which involves the reaction of hydroquinone with a methylating agent to obtain 4-methoxy phenol followed by alkylation of this compound with a tertiary butyl radical such as isobutylene or tertiary butyl alcohol, the principal isomer obtained is the 3-tertiary butyl-4-methoxy phenol. Except for minor modifications of technique, the prior art reaction has been known and used for a long time and is well described in the literature. This prior art procedure is subject to certain inherent disadvantages which may be avoided through operation in accordance with our invention. In the first place, as has been pointed out above, it is not possible to convert hydroquinone completely to the corresponding monomethyl ether, viz. 4-methoxy phenol, by means of any heretofore known practical process. As further pointed out above, part of the starting hydroquinone is unavoidably converted into hydroquinone dimethyl ether, viz. 1,4-dimethoxy benzene, which cannot be applied in the manufacture of derivatives of mono-tertiary butyl-4-methoxyphenol without adding an additional step. In addition, the butylation of hydroquinone monomethyl ether, viz. 4-methoxy phenol, presents further difficulties in that the product is contaminated with dibutylated derivatives of 4-methoxy phenol as well as unreacted starting material. Thus, isolation of isomers of mono-tertiary butyl-4-methoxyphenol requires a careful separation from these impurities. Although any unreacted 4-methoxy phenol may be recovered and recycled, the dibutylated derivative is of little or no value as a food antioxidant.

A further disadvantage which results through the use of the prior art procedure is to be found in the unfavorable ratio of the two possible isomers of mono-tertiary butyl-4-methoxy phenol as mentioned above, i. e. the 3-tertiary butyl-4-methoxyphenol predominates in the prior art procedure, whereas the 2-tertiary butyl-4-methoxyphenol is the most effective food antioxidant.

According to the present aspect of the invention, the preparation of a higher yield of the desired 2-tertiary butyl-4-methoxyphenol can be achieved with greater economy and over-all efficiency by a system of operations which is in inverted order to that employed in accordance with the prior art procedure discussed. Thus, our procedure provides for the monobutylation of the hydroquinone followed by the subsequent conversion to the desired monomethyl ether. Since mono-tertiary butylhydroquinone has not heretofore been available by a practical process until that described hereinabove under the first aspect of this invention, our invention in its over-all considerations represents a marked improvement over the prior art.

According to this aspect of our invention, the formation of useless by-products is held to a remarkably low value. By using a dialkyl sulfate such as dimethyl sulfate to obtain a crude product consisting almost entirely of the monomethyl ether of tertiary butyl hydroquinone (viz. mono-tertiary butyl-4-methoxyphenol) there is little or no simultaneous conversion to the dimethyl ether of tertiary butyl hydroquinone which has no particular value as a food antioxidant. In accordance with our process, any unreacted monotertiary butyl hydroquinone can be separated very easily by solution in hot water in which mono-tertiary butyl-4-methoxyphenol is insoluble. Thus the entire process beginning with hydroquinone described under the first aspect of our invention through to the preparation of the mixed isomers of mono-tertiary butyl-4-methoxyphenol may be conducted with negligible loss of material. In addition, it has been discovered that by operation according to the procedures described below, the more potent antioxidant, viz. 2-tertiary butyl-4-methoxyphenol, predominates in the final product.

In operating under this aspect of our invention it is advantageous to react mono-tertiary butyl hydroquinone with dimethyl sulfate in the presence of aqueous sodium hydroxide. The reactants can be advantageously stirred at reflux temperature until monomethylation has been completed, after which the reaction mixture can be advantageously cooled to room temperature and subsequently acidified. The desired mixture of isomers of tertiary butyl-4-methoxyphenol can then be advantageously extracted from the aqueous acidified reaction mixture by means of a suitable solvent which can advantageously be benzene. The extract can then be advantageously purified by distillation at reduced pressure. Alternatively, the purification by distillation can be advantageously simplified by extraction of the unreacted mono-tertiary butyl hydroquinone from the crude mixture by means of hot water in which the desired mixture of isomers of mono-tertiary butyl-4-methoxyphenol is insoluble.

It is evident that other alkali metal hydroxides besides sodium hydroxide can be employed, e. g. potassium hydroxide, etc. The acidification can be accomplished advantageously by employing concentrated hydrochloric acid; however, other strong acids can also be employed, e. g. hydrobromic acid, sulfuric acid, etc.

The quantity of dimethyl sulfate should be somewhat greater than the stoichiometrical amount for the desired monoetherification, based on the utilization of both methyl groups of the dimethyl sulfate. The dimethyl sulfate used need not be more than double the stoichiometrical quantity. The sodium hydroxide or other alkaline-acting reagent should be sufficient to avoid the formation of free acid during the etherification. The period of time required for conducting the reaction can be varied considerably; ordinarily no more than 18 hours is necessary and a much shorter period of time can be employed.

In addition to the employment of dimethyl sulfate as the etherification reagent, other similar dialkyl sulfates can be employed as well as other compounds well known in the art to be useful as etherification reagents, e. g. methyl acid sulfate, methyl chloride, diethyl sulfate, etc. However, since the product desired is the monomethyl ether, the disclosure will be directed toward the preparation of this compound employing methyl chloride, dimethyl sulfate or methyl acid sulfate. It is obvious that twice as many mole proportions of methyl chloride or methyl acid sulfate are necessary to provide the equivalent quantity of methyl radicals as are provided by dimethyl sulfate. In addition to employing mono-tertiary butyl hydroquinone, other similar analogous derivatives of hydroquinone can be employed according to this process; however, since the isomers of the monomethyl ether of tertiary butyl hydroquinone are the most advantageous food antioxidants, this disclosure will be directed primarily toward such compounds.

Contact of the alkaline solution of mono-tertiary butyl hydroquinone with atmospheric oxygen has deleterious results, i. e. it apparently undergoes rapid oxidation to form the corresponding quinone and subsequently forms highly colored quinone condensation products. We have found that the addition of at least about 0.1% of comminuted zinc, and advantageously from about one-quarter to about one-half percent of zinc dust (based on the weight of the mono-tertiary hydroquinone employed), in combination with the use of an inert atmosphere, e. g. nitrogen, almost completely eliminates these deleterious colored impurities in the crude product. If there is a trace of residual color in the crude product, removal may be made by complete distillation in the presence of 0.1 percent zinc dust. It is evident that other metallic dusts equivalent to zinc dust could be similarly employed.

The length of time for the addition and the avoidance of an excess of dimethyl sulfate do not appear to be especially critical in the operation of the process described. The presence of some excess dimethyl sulfate does not result in substantial etherification of the hydroxy radical ortho to the tertiary butyl radical. In an experiment, 66.5 percent excess of dimethyl sulfate was added in 40 minutes at reflux and the reflux temperature was maintained for five hours. The yield of the mixed isomers of tertiary buytl-4-methoxyphenol was 77½ percent and the yield of the diether by-product, viz. mono-tertiary butyl-1,4-dimethoxy phenol was 13 percent.

The following example will serve to further illustrate this aspect of the invention.

*Example 6*

332 grams of mono-tertiary butyl hydroquinone and 1 gram of zinc dust were slurried with water in an inert nitrogen atmosphere, and the temperature of the mixture was increased to reflux. Next, 85 grams of sodium hydroxide was added. 140 grams of dimethyl sulfate was introduced over a 45-minute period and the reactants were maintained under reflux conditions for 18 hours. On cooling, 25 cc. of concentrated hydrochloric acid was added to acidify the reaction mixture, and the crude product was extracted with benzene. After washing the benzene extract with warm water, the solvent was removed and crude tertiary butyl -4-methoxyphenol was isloated as a viscous liquid or low melting solid weighing 348 grams. On purifiication by fractional distillation, only four grams of tertiary butyl-1,4-dimethoxy benzene (the dimethyl ether) was isolated as a low boiling fraction. The distillation then yielded 271 grams of the mixed isomers of the desired product, viz. mono-tertiary butyl-4-methoxyphenol, leaving a residue of 73 grams of a mixture of this desired product together with unreacted mono-tertiary butyl hydroquinone. This residue was recycled in a succeeding run of the process just described. A representative portion of the 271 grams of mixed isomers of monotertiary butyl-4-methoxyphenol showed the following composition:

79.4% of 2-tertiary butyl-4-methoxyphenol
17.6% of 3-tertiary butyl-4-methoxyphenol In order to show the improvement achieved by our invention over the prior art, 4-methoxy phenol was alkylated with tertiary butyl alcohol in accordance with the above described prior art procedure and the product obtained was analyzed and found to have the following composition:

2.0% of 4-methoxyphenol
40.5% of 2-tertiary butyl-4-methoxyphenol
52.1% of 3-tertiary butyl-4-methoxyphenol
5.4% of 2,5-di-tertiary butyl-4-methoxyphenol The above ratio of the 2-isomer to the 3-isomer is 0.78 which can be compared with the ratio obtained in the employment of the process described in Example 6 wherein 79.4% of the 2-isomer and 17.6% of the 3-isomer are obtained, thereby giving a ratio of 4.5. This marked improvement over the prior art is indeed quite pronounced. It is apparent that, through the use of the process of our invention, the ratio of the most desirable isomer is increased from 0.78 to 4.5. At the same time, the total concentration of the combination of both isomers is increased from 92.6% to 97% because of the more facile separation of product from impurities.

In Example 6, 332 grams of mono-tertiary butyl hydroquinone yielded 271 grams of butylated-4-methoxy phenol isomers, four grams of mono-tertiary butyl 1,4-dimethoxy phenol benzene and 73 grams of a mixture of starting material with some residual butylated-4-methoxy phenol. No analysis was made of the 73-gram residue inasmuch as it was suitable for reemployment in a subsequent run. If the 73-gram residue was entirely a mixture of the isomers of mono-tertiary butyl-4-methoxy-phenol, then the overall yield would be over 95 percent. If the 73-gram residue was entirely the starting material, then the overall yield based on the quantity of starting material consumed would be over 96 percent. In either instance, it is evident that the process of this aspect of our invention produces very high yields of the mixed isomers of monotertiary butyl-4-methoxyphenol.

In addition to the preferred advantageous employment of dimethyl sulfate as described in Example 6, good results can also be advantageously obtained employing methyl chloride or methyl acid sulfate. Thus, the 140 grams of dimethyl sulfate in Example 6 can be replaced with about 115 grams of methyl chloride or about 250 grams of methyl acid sulfate. When employing methyl chloride, a pressure vessel, e. g. an autoclave, is necessary because of the gaseous nature of this reactant.

ODORIFEROUS PROPERTIES OF PRODUCTS

As indicated in Example 6, a small quantity of the diether is produced as a by-product. This diether, viz. monotertiary butyl-1,4-dimethoxybenzene has been found to possess valuable properties as an odoriferous compound in the preparation of perfumes and odoriferous compositions. Moreover, similar properties are possessed by homologous compounds wherein the tertiary butyl group is replaced with a similar homologous secondary or tertiary alkyl group. The odor of tertiary butyl-1,4-dimethoxy-benzene can be characterized as a powerful aroma of an earthy, musty character, similar to that of raw potatoes. This odor has a high life expectancy due to the low evaporation rate of this compound. Moreover, this compound has a high degree of compatibility when employed in compounding odorants. Because of the odor similarity of this compound to oil of Patchouly and Vetiver oil, this compound can be substituted in place of part or all of either of these oils in the original formulas for various odoriferous compositions, e. g., those disclosed by Poucher, "Perfumes, Cosmetics and Soaps," vol. 2. For example, see the formula on page 276 for Pavette No. 1142 and Chypre No. 1245 and the formula on page 341 for Cedar No. 1241. It was found that by making such substitutions in several instances, there was no marked difference in aroma in the aged and fresh samples of the original formula disclosed by Poucher as compared with the same formula except for the substitution of mono-tertiary butyl-1,4-dimethoxybenzene. Besides the employment of the diethers as just disclosed, the corresponding mono-ethers such as those disclosed as food antioxidants prepared according to the process covered under the second aspect of the invention described hereininabove, can also be employed because of their distinctive aromas for similar purposes, e. g., 2-tertiary butyl-4-methoxy phenol. The same can be said for other related monoalkylated homologous hydroquinone mono and di-ethers as well as polyalkylated hydroquinone ethers. Hydroquinone ethers containing substituents other than simple alkyl groups may be considered as odoriferous compounds.

We claim:

1. A process for preparing mono-tert. butylhydroquinone which comprises reacting hydroquinone with a branched-chain compound selected from those of the group consisting of isobutylene and tert. butyl alcohol admixed with an aromatic hydrocarbon containing from 6 to 8 carbon atoms in the presence of phosphoric acid at an elevated temperature with agitation.

2. A process as defined in claim 1 wherein the elevated temperature is from about 65° C. to about 110° C.

3. A process as defined in claim 2 wherein reflux conditions are maintained.

4. A process as defined in claim 3 where approximately equimolecular proportions of the hydroquinone and branched-chain compound are employed.

5. A process as defined in claim 4 wherein the branched-chain compound is gradually added to a mixture of the hydroquinone, phosphoric acid and aromatic hydrocarbon.

6. A process as defined in claim 5 wherein the weight of aromatic hydrocarbon employed is from about 1 to about 2 times the combined weight of the hydroquinone and branched-chain compound.

7. A process as defined in claim 6 wherein the branched-chain compound is tert. butyl alcohol and the water formed is substantially removed by azeotropic distillation as it forms.

8. A process as defined in claim 7 wherein the aromatic hydrocarbon is toluene.

9. A process as defined in claim 7 wherein the aromatic hydrocarbon is xylene.

10. A process for preparing mono-tert. butylhydroquinone which comprises (1) admixing under reflux conditions about one mole proportion of hydroquinone, from about 1 to about 5 times the same weight of phosphoric acid and from about 1 to about 2 times the same weight of an aromatic hydrocarbon containing from 6 to 8 carbon atoms, (2) maintaining this admixture at its boiling point under good agitation and gradually introducing into this admixture about one mole proportion of tertiary butyl alcohol while substantially concurrently removing water by azeotropic distillation, (3) thereafter separating while hot the layer containing the principal part of the aromatic hydrocarbon from the layer containing the phosphoric acid and (4) then cooling this layer whereby mono-tertiary butylhydroquinone separates as crystals.

11. A process as defined in claim 10 wherein the aromatic hydrocarbon is toluene.

12. A process as defined in claim 10 wherein the aromatic hydrocarbon is xylene.

13. A process for preparing mono-tertiary butylhydroquinone which comprises (1) admixing approximately equal volumes of phosphoric acid (calculated as 85% phosphoric acid) and an aromatic hydrocarbon containing from 6 to 8 carbon atoms, (2) maintaining this admixture at its boiling point and maintaining the lower portion of this admixture under good agitation while continuously introducing into this admixture approximately equimolecular proportions of hydroquinone and tertiary butyl alcohol together with sufficient additional aromatic hydrocarbon to replace that removed as indicated in (3) and (4) hereinbelow, (3) continuously removing water substantially concurrently as it is formed by means of distilling off an azeotrope of water and aromatic hydrocarbon, (4 continuously removing from the upper part of the liquid reaction mixture a minor portion thereof which comprises a solution of mono-tertiary butylhydroquinone dissolved in the aromatic hydrocarbon, and (5) separating the mono-tertiary butylhydroquinone from this solution.

14. A process as defined in claim 13 wherein the aromatic hydrocarbon is toluene.

References Cited in the file of this patent

UNITED STATES PATENTS

| | | |
|---|---|---|
| 1,717,105 | Hirzel | June 11, 1929 |
| 2,137,815 | Stockelbach | Nov. 22, 1938 |
| 2,140,782 | Arnold et al. | Dec. 20, 1938 |
| 2,226,177 | Orelup | Dec. 24, 1940 |
| 2,439,421 | Erickson | Apr. 13, 1948 |
| 2,470,902 | Rosenwald | May 24, 1949 |
| 2,511,193 | Bean et al. | June 13, 1950 |
| 2,572,822 | Smith | Oct. 23, 1951 |
| 2,615,051 | Grote | Oct. 21, 1952 |